US010071889B1

(12) United States Patent
Lopez

(10) Patent No.: US 10,071,889 B1
(45) Date of Patent: Sep. 11, 2018

(54) PIÑATA HOISTING DEVICE

(71) Applicant: Gerardo Lopez, Pasadena, CA (US)

(72) Inventor: Gerardo Lopez, Pasadena, CA (US)

( * ) Notice: Subject to any disclaimer, the term of this patent is extended or adjusted under 35 U.S.C. 154(b) by 0 days.

(21) Appl. No.: 15/614,017

(22) Filed: Jun. 5, 2017

(51) Int. Cl.
*F16M 11/00* (2006.01)
*B66C 23/16* (2006.01)
*A63B 67/10* (2006.01)
*A63B 71/02* (2006.01)

(52) U.S. Cl.
CPC ............ *B66C 23/163* (2013.01); *A63B 67/10* (2013.01); *A63B 71/023* (2013.01); *A63B 2210/50* (2013.01); *A63B 2225/093* (2013.01); *B66D 2700/026* (2013.01)

(58) Field of Classification Search
CPC ........ F16M 11/00; F16M 11/26; F16M 11/28; F16M 13/00; F16M 13/02
USPC ......... 248/125.2, 434, 435, 188.6, 161, 165, 248/405
See application file for complete search history.

(56) References Cited

U.S. PATENT DOCUMENTS 3,980,276 A * 9/1976 Burkland .............. B60P 1/5476 254/415
6,007,032 A * 12/1999 Kuo ....................... F16M 11/10 248/125.1
6,412,736 B1 7/2002 Zaragoza
6,669,152 B2 12/2003 Hernandez
6,755,381 B1 * 6/2004 Levin ..................... F16M 11/16 248/163.1
6,978,974 B1 12/2005 Marasco
D542,501 S 5/2007 Lopez
D613,592 S 4/2010 Clark
9,156,664 B1 10/2015 Lopez
9,345,941 B1 5/2016 Celedon et al.
9,791,099 B1 * 10/2017 Page .................... F16M 13/022
2008/0073468 A1 * 3/2008 Arroyo .................. A63B 67/10 248/122.1
2008/0271947 A1 * 11/2008 Henning ................. E04D 15/02 182/45
2012/0312937 A1 * 12/2012 Weber .................... A63B 67/10 248/125.2
2017/0225018 A1 * 8/2017 Palet .................. A62B 35/0068

* cited by examiner

*Primary Examiner* — Steven M Marsh
(74) *Attorney, Agent, or Firm* — Ernesto Garcia

(57) ABSTRACT

A piñata hanging or holder device offers the user stability and flexibility in controlling a piñata at party events. The hanging device is collapsible for shipping and storage. The hanging device is easily assembled and utilizes the user's weight to further stabilize the device from falling or tilting. For assembly, guiding marks are providing in poles to assist the user for ease of assembly. One benefit of this device is that the device does not require anchoring or include a ballast to keep the handing device erect, which reduces shipping and manufacturing cost.

19 Claims, 4 Drawing Sheets

PIÑATA HOISTING DEVICE

TECHNICAL FIELD

The hoisting device pertains to assisting a user in holding or hoisting a piñata at a party event in case there are no trees or rooftops that are easily accessible for hanging a piñata.

BACKGROUND OF THE INVENTION

Many piñata hoisting device are well known. One prior art is by the same applicant, U.S. D542,501, which teaches the use of heavy base with interconnecting poles of which one has at one end a pulley reeling a cord connected to a piñata. This device however offers the user, hoisting the piñata, to be standing near a hitting person with a stick. Given the heavy base, this prior hoisting device is very costly to ship and to be dragged around to a different location.

Another known device is to Zaragoza, U.S. Pat. No. 6,412,736, this one uses a pair of refillable ballast containers and several braces to keep a post vertical. Two pulleys are used in a horizontal fixed beam to reel a cord holding a piñata. Lopez, U.S. Pat. No. 9,156,664, teaches another hoisting device with a movable boom pipe pivotally connected to a vertical post, which is connected to a weight block. Marasco, U.S. Pat. No. 6,978,974, utilizes a horizontal boom braced to a telescoping post anchored to refillable container for a ballast. This one further details a pair of wheels to move the device around. However, all these devices require a ballast to be provided or be provided with a container to be filled with water as ballast. Other known piñata devices required the device to be anchored in ground on top of having heavy ballast members. No such device provides the uniqueness of not having a ballast provided or fillable during assembly.

SUMMARY OF THE INVENTION

The instant invention is a piñata, hoisting or holding, device in the shape of a tripod with collapsible legs as part of a base. The holding device is comprised of several interconnected pipes and one taking the place of a brace to angle a support pipe. The holding device further features adjustable legs to put the device in non-planar surfaces. Furthermore, the adjustable legs are provided with antislip tape or traction tape so that a person using the holding device can provide their own person weight with their foot to keep the holding device erect or tilting. The antislip tape prevents anyone foot from sliding away from the legs.

The hoisting or holding device is envisioned to be easily assembled with the use of markings, which direct the user to connect each of the interconnected pipes and secure them with pins, cotter pins, or quick release pins. It is envisioned that the interconnected pipes are made from metal but of course the pipes can also be made from plastic.

DETAILED DESCRIPTION

Figure 1:
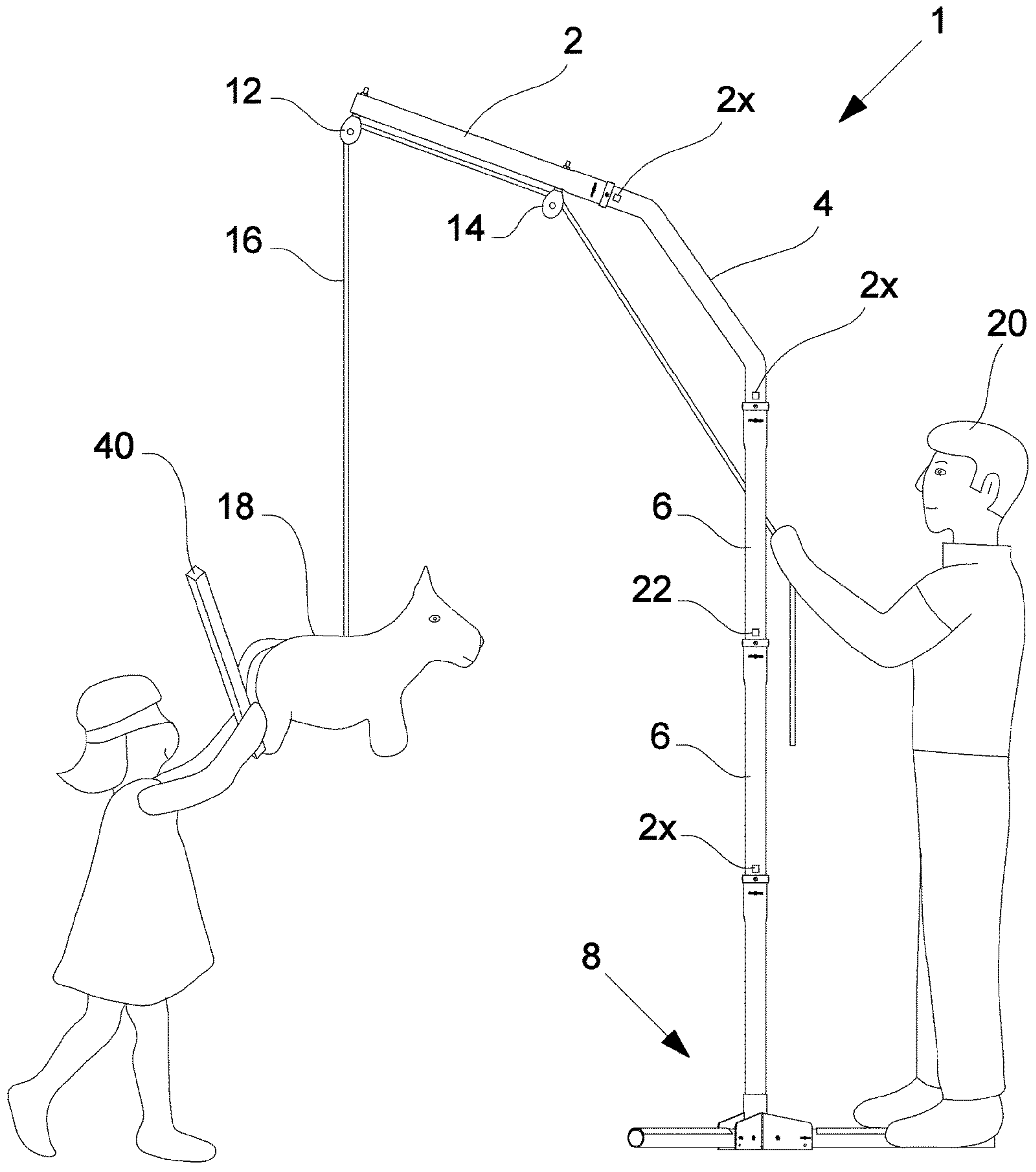
FIG. 1 shows a front view of the hoisting or holding device being utilized.
Figure 2:
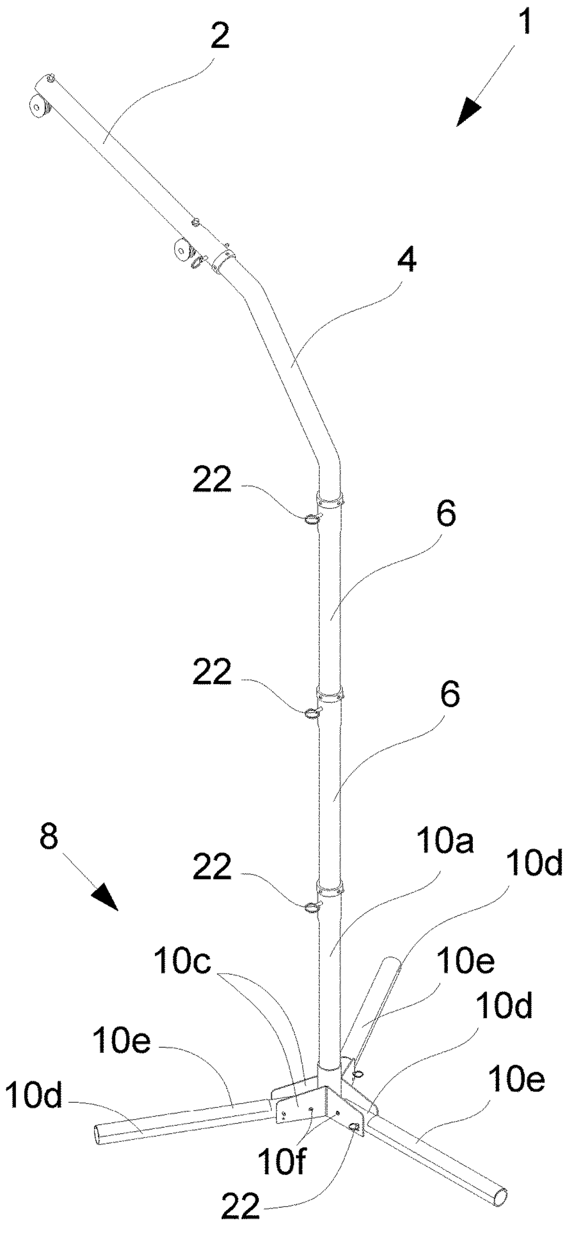
FIG. 2 shows an isometric view of hoisting or holding device shown in FIG. 1.

FIG. 1 shows a piñata hoisting or holding device 1 in use. The holding device includes a foldable base 8, a support pipe 2, and angled brace pipe 4, and two vertical posts 6. The support pipe 2 is interconnected to angled brace pipe 4. The angled brace pipe 4 connects to one of the two vertical posts 6, while the one vertical post 6 is interconnected to the second vertical post 6, which then connects to the brace 8 as shown in FIG. 2. The support pipe 2 is equipped with two pulleys 12, 14 at opposite ends of the support pipe 2. The support pipe 2 is comprised of a cylindrical pipe 2*a* and a widened connecting section 2*b*. A cord, a wire, a cable, or a rope 16 passes through the pulleys 12, 14 to hoist a piñata 18. A user 20 grabs the rope 16, which can safely manipulate the piñata while away from the hitting action.

Figure 3:
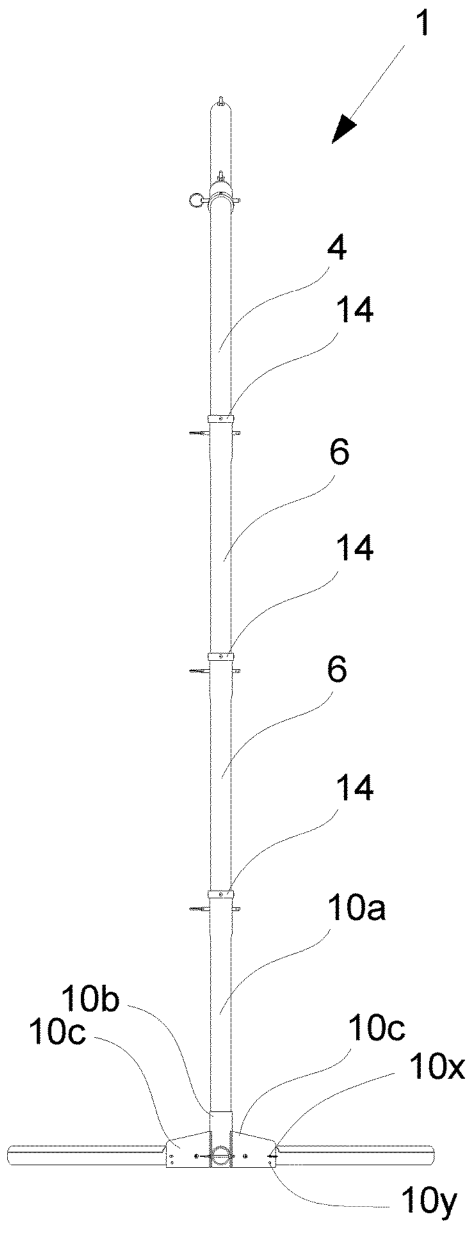
FIG. 3 shows a right side view of the hoisting or holding device shown in FIG. 1.
Figure 4:
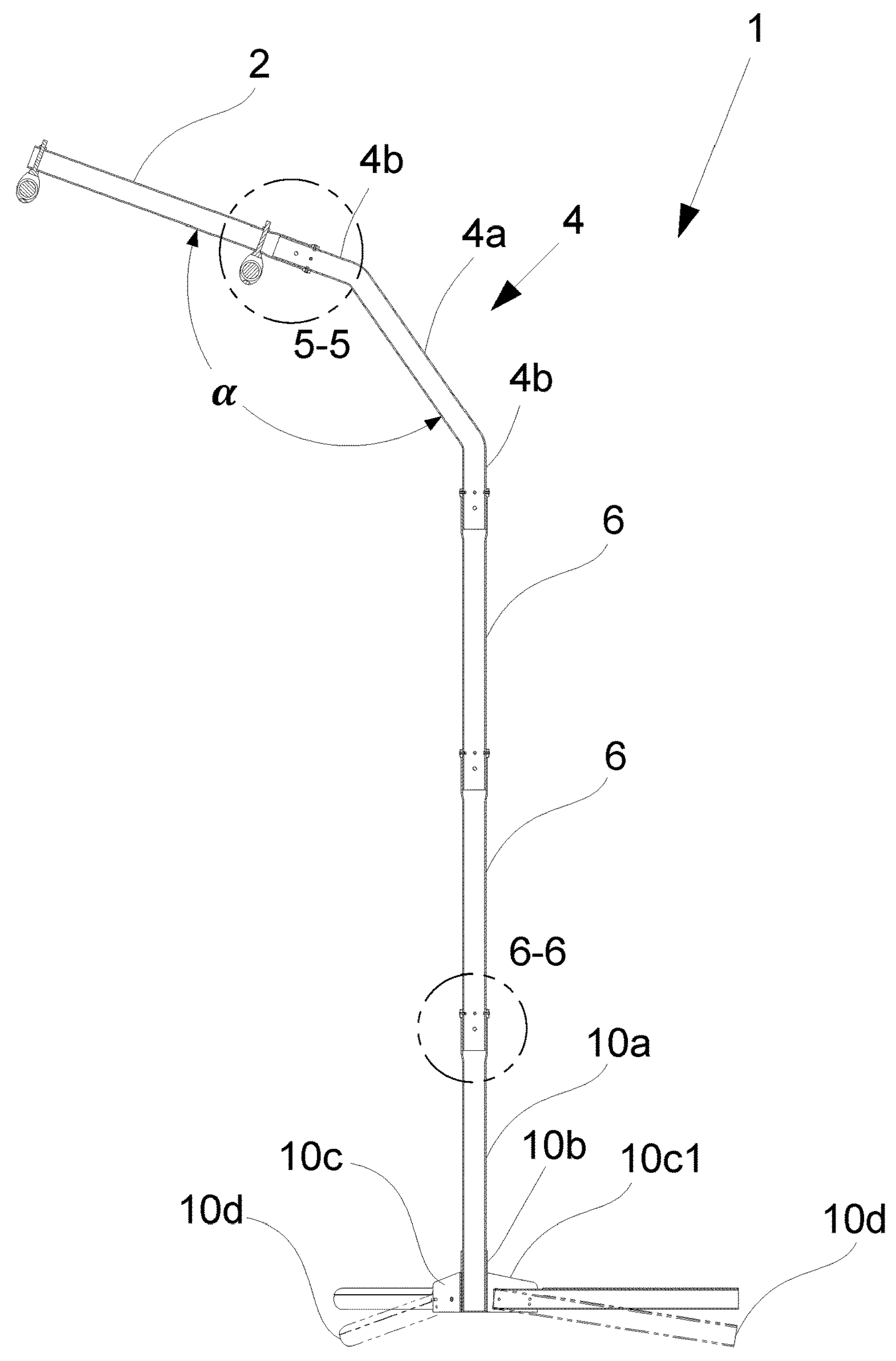
FIG. 4 shows cross-sectional view 4-4 shown in FIG. 7.

As seen in FIGS. 2 and 3, the base 8 is comprised of a center pipe 10*b* and a base pipe 10*a* is inserted into the center pipe 10*b* and welded to the center pipe 10*b* at its rim for instance. Three pairs of parallel plates 10*c* are set 120 degrees apart from each other to form a fork at which base legs 10*d* are pivotally connected at pivot connections 10*f*. The parallel plates 10*c* are welded to each other as well to the center pipe 10*b* to provide sturdiness. The parallel plates 10*c* have an angled surface 10*c*1 to stabilize the base towards the center of the base 8. Each of the parallel plates 10*c* further includes a pair of adjusting holes 10*x*, 10*y* as seen in FIG. 3. These adjusting holes 10*x*, 10*y* allow the hoisting device 1 to be set on a planar surface or a non-planar surface by angling the base legs 10*d* more as seen in FIG. 4 in phantom. The base legs 10*d* further includes antislip tape 10*e* in the form of sand paper or other form of traction tape.

At one end of the base pipe 10*a* is a widened connecting section 2*b*, which connects to one of the vertical posts 6. Each widened connecting section 2*b* includes a through hole 2*c* used for connection, as best seen in FIGS. 5 and 6, using pins, cotter pins, or quick release pins 22.

Figure 6:
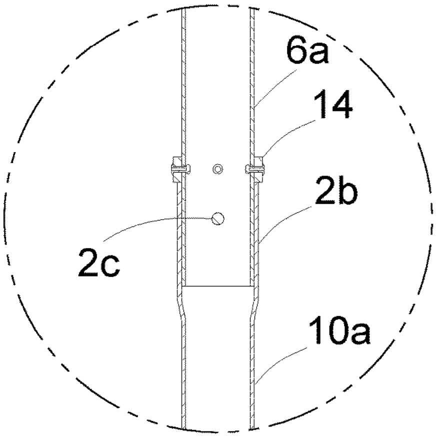
FIG. 6 shows blown-up view 6-6 shown in FIG. 4 showing details of interconnected pipe at a second location.
Figure 7:
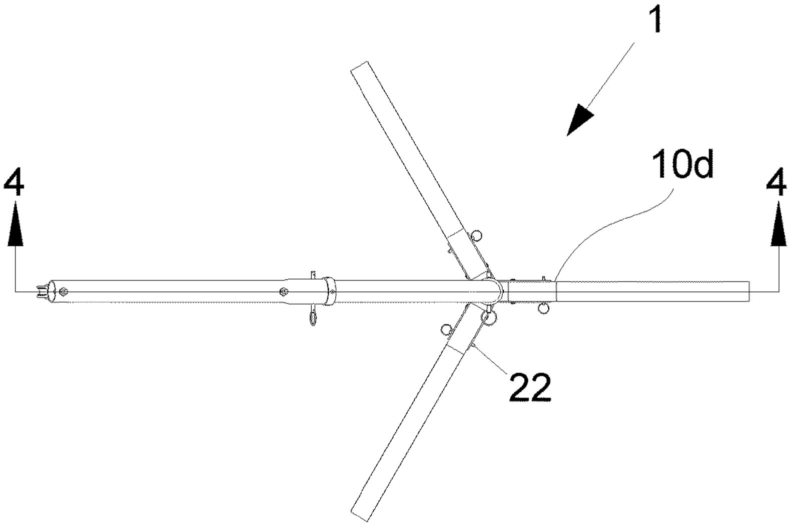
FIG. 7 shows a top view of the hoisting or holding device shown in FIG. 2.

As seen in FIGS. 4 and 6, the vertical posts 6 are each comprised of a cylindrical section 6*a* that is undersized to fit inside the widened connecting section 2*b*. Since the two vertical posts 6 are identical, the two posts 6 can connect to each other. Thereafter, the angled brace pipe 4 connects to the widened connecting section 2*b* of one of the vertical posts 6. As shown in FIG. 4, the angled brace pipe 4 is comprised of a bridge pipe 4*a* and two section pipes 4*b* that are obtuse to the bridge pipe 4*a* and at each end of the bridge pipe 4*a*. The angle $\alpha$ between the bridge pipe 4*a* and the section pipes 4*b* is 145 degrees preferably, but could be more or less.

Figure 5:
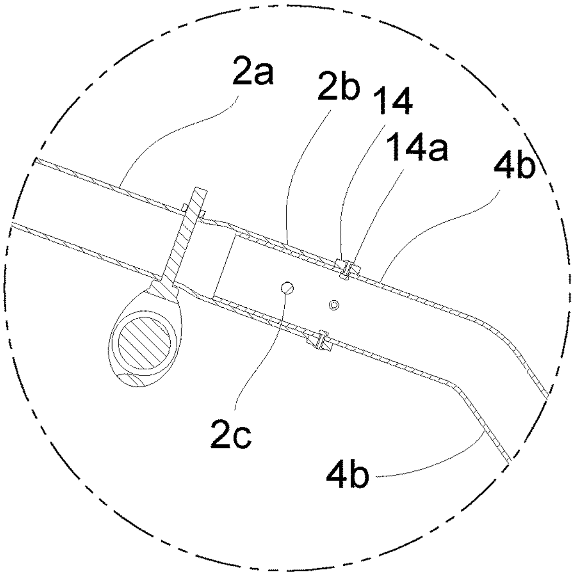
FIG. 5 shows blown-up view 5-5 shown in FIG. 4 showing details of interconnected pipes at one location.

As seen in FIGS. 3, 5 and 6, the vertical posts 6 and the brace pipe 4 have a stop ring 14 fastened via rivets to prevent the posts 6 and brace pipe 4 from going in further into the widened sections 2*b*. The brace pipe 4 has them at both section pipes 4*b*, and the vertical posts 6 have one at the cylindrical section 6*a*. The stop ring 14 not only prevents the posts 6 and brace pipe 4 from going in further into the widened sections 2*b* but also keeps them from moving or tilting in case their clearance between their connections is big.

To assemble the hoisting or holding device 1, a marking 2*x* is located adjacent to one of the rivets to indicate alignment with the though hole 2*c* in the widened section 2*b*.

The marking 2*x* can be a sticker or an engraving. Once assembled, one can reel the rope 16 attached to piñata 18. To use, one simple steps with one foot on the antislip tape 10*e* of one of the base legs 10*d* to keep the hoisting device 1 from tilting or falling.

The pivot connectors 10*f* are mainly screws or barrel screw combinations that permanently keep the base legs 10*d* pivotally connected but of course any pivot connection is envisioned. While rivets have been disclose for connecting the rings 14, other fasteners are envisioned to connect it. It is envisioned that the shape of the pipes can also be rectangular and that the locking holes 10*x*, 10*y* be more than two. While the hoisting device is envisioned for hoisting piñatas, it is envisioned that device can be used to hoist anything else that needs to raised or dropped.

The invention claimed is:

1. A hoisting device comprising a collapsible tripod base, a first vertical tube, a second vertical tube, an angled brace tube, and a support pipe;

wherein the base comprises a center tube, a base tube, three pairs of parallel plates permanently connected to the center tube, and three rotatable base legs;

wherein the three pairs of parallel plates are evenly spaced apart from each other and form a fork;

wherein the first vertical tube being connected to the base tube at one end and the second vertical tube being connected to the first vertical tube;

wherein the angled brace tube being connected to the second vertical tube;

wherein the support pipe being connected to the angled brace tube;

wherein the support pipe including at least one pulley; and, wherein the support pipe, the first vertical pipe, and the second vertical pipe each including a cylindrical pipe and a ring exteriorly connected to the cylindrical pipe with at least one fastener.

2. The hoisting device of claim 1, further including a rope, cable, cord, or wire reeling through the at least one pulley.

3. A hoisting device comprising a collapsible tripod base, a first vertical tube, a second vertical tube, an angled brace tube, and a support pipe;

wherein the base comprises a center tube, a base tube, three pairs of parallel plates permanently connected to the center tube, and three rotatable base legs;

wherein the three pairs of parallel plates are evenly spaced apart from each other and form a fork;

wherein the first vertical tube being connected to the base tube at one end and the second vertical tube being connected to the first vertical tube;

wherein the angled brace tube being connected to the second vertical tube;

wherein the support pipe being connected to the angled brace tube;

wherein the support pipe including at least one pulley; and, wherein the base legs rotatably connected to the parallel plates and including at least one non-skid tape on a top surface of the base legs.

4. The hoisting device of claim 1, wherein the base legs including a pivot hole and a locking hole;

wherein the pair of plates including a corresponding pivot hole and at least a pair of adjusting holes; and, wherein each of the base legs being lockable with a removable pin passing through one of the adjusting holes and the locking hole.

5. The hoisting device of claim 1, wherein the angled brace tube comprising a bridge pipe and two section pipes extending at an angle relative to the bridge pipe.

6. The hoisting device of claim 5, wherein the support pipe, the first vertical pipe, and the second vertical pipe each including a cylindrical pipe and widened connecting section extending from the cylindrical pipe.

7. The hoisting device of claim 6, wherein the widened connecting section including a through hole;

wherein the cylindrical pipe of the first and second vertical pipes and the two section pipes of the brace tube including a through pin hole; and, wherein a releasable pin respectively passes through the through hole of the connecting section and the pin hole.

8. The hoisting device of claim 7, the support pipe, the first vertical pipe, and the second vertical pipe each including a cylindrical pipe and a ring exteriorly connected to the cylindrical pipe with at least one fastener; and, wherein the fastener being aligned with the through pin hole.

9. The hoisting device of claim 8, wherein a marking being adjacent to the at least one fastener.

10. A hoisting device comprising a collapsible tripod base, a first vertical tube, a second vertical tube, an angled brace tube, and a support pipe;

wherein the base comprises a center tube, a base tube, three pairs of parallel plates permanently connected to the center tube, and three rotatable base legs;

wherein the three pairs of parallel plates are evenly spaced apart from each other and form a fork;

wherein the first vertical tube being connected to the base tube at one end and the second vertical tube being connected to the first vertical tube;

wherein the angled brace tube being connected to the second vertical tube;

wherein the support pipe being connected to the angled brace tube; and, wherein the support pipe including at first pulley a one end of the support pipe and a second pulley at a second end of the support pipe.

11. The hoisting device of claim 10, further including a rope, cable, cord, or wire reeling through the first pulley and the second pulley.

12. The hoisting device of claim 10, wherein the base legs are rotatably connected to the parallel plates and including at least one non-skid tape on a top surface of the base legs.

13. The hoisting device of claim 10, wherein the base legs including a pivot hole and a locking hole;

wherein the pair of plates including a corresponding pivot hole and at least a pair of adjusting holes; and, wherein each of the base legs being lockable with a removable pin passing through one of the adjusting holes and the locking hole.

14. The hoisting device of claim 10, wherein the angled brace tube comprising a bridge pipe and two section pipes extending at an angle relative to the bridge pipe.

15. The hoisting device of claim 14, wherein the support pipe, the first vertical pipe, and the second vertical pipe each including a cylindrical pipe and widened connecting section extending from the cylindrical pipe.

16. The hoisting device of claim 15, wherein the widened connecting section including a through hole;

wherein the cylindrical pipe of the first and second vertical pipes and the two section pipes of the brace tube including a through pin hole; and, wherein a releasable pin respectively passes through the through hole of the connecting section and the pin hole.

17. The hoisting device of claim 16, the support pipe, the first vertical pipe, and the second vertical pipe each including a cylindrical pipe and a ring exteriorly connected to the cylindrical pipe with at least one fastener; and, wherein the fastener being aligned with the through pin hole.

18. The hoisting device of claim 17, wherein a marking being adjacent to the at least one fastener.

19. The hoisting device of claim 10, wherein the support pipe, the first vertical pipe, and the second vertical pipe each including a cylindrical pipe and a ring exteriorly connected to the cylindrical pipe with at least one fastener.

* * * * *